Nov. 6, 1934. C. H. GUNN 1,979,541
FERTILIZER DISTRIBUTOR.
Filed Sept. 3, 1932
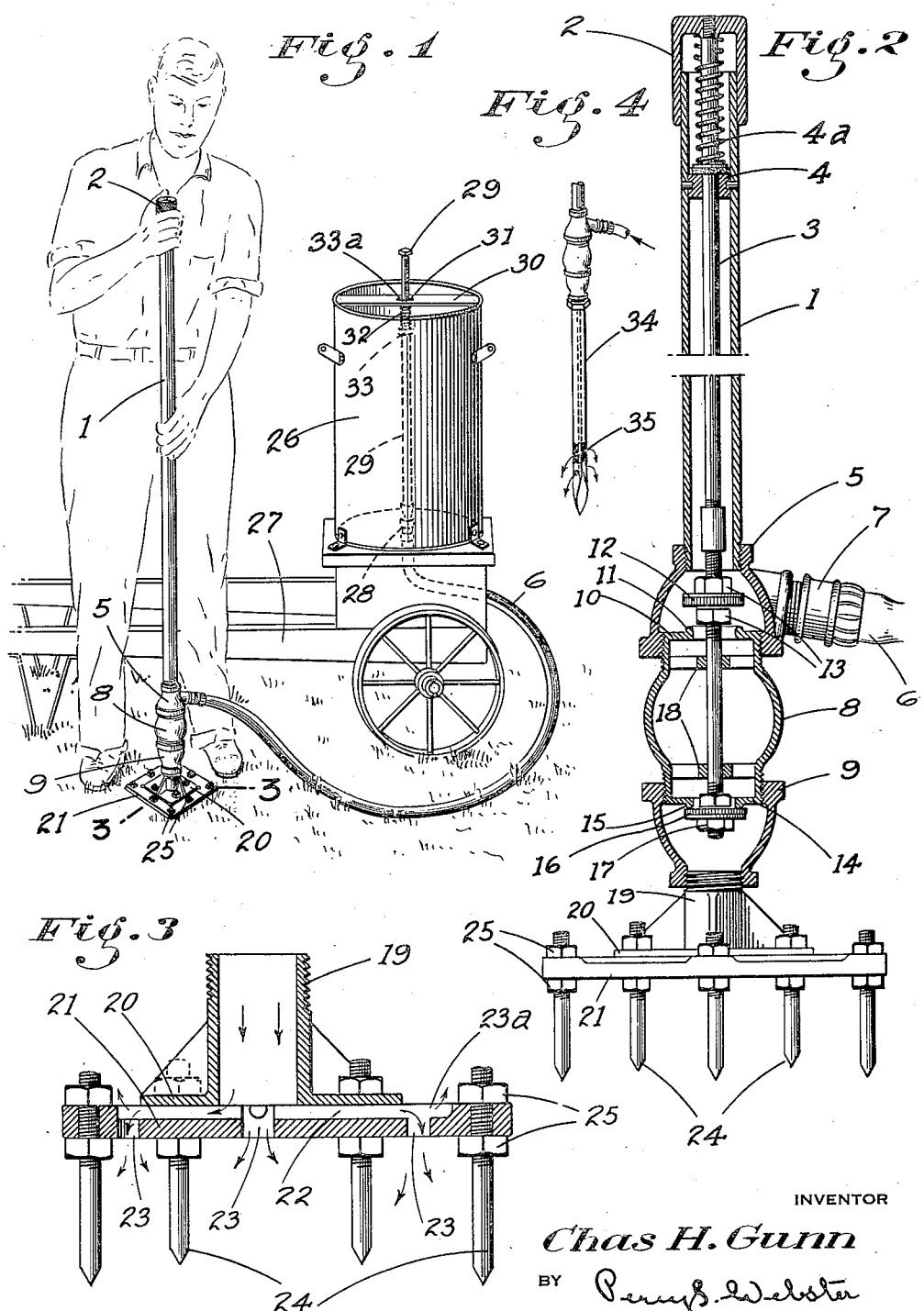
INVENTOR
Chas H. Gunn
BY
ATTORNEY Patented Nov. 6, 1934

1,979,541

UNITED STATES PATENT OFFICE 1,979,541

FERTILIZER DISTRIBUTOR

Charles H. Gunn, Burlingame, Calif.

Application September 3, 1932, Serial No. 631,601

4 Claims. (Cl. 111—6)

This invention relates to a fertilizer distributor which punctures the surface of the ground in a uniform manner and distributes liquid fertilizer into the ground as well as over the surface. The apparatus is especially adapted for use on lawns, although it can be made of general application wherever fertilization is desired. The fertilizer compound or concentrate is in solution with a relatively large volume of water which is passed from a supply tank through a hose connection to the puncturing device with means provided to allow only a predetermined amount of liquid to flow into the ground during any one puncturing movement.

The device can also be operated with a continual flow, as will appear subsequently.

The principal object of my invention is to provide a fertilizer distributor which will make possible immediate fertilization beneath the surface of the ground and also to prevent an excessive aggregation of fertilizer in any one spot on the surface and a deficiency of fertilizer in another. The accepted method today is to spread the fertilizer over the surface and then to apply the water. This often results in washing the fertilizer from the high spots on the ground to the lower spots with the result that the high spots are not fertilized and the low spots are surfeited which retards the growth of the lawn or other plant life. Too, this surface distributing method does not reach the roots of the plants which, on the other hand, is so successfully performed by my invention. Also where the surface distributing method is used it is easily possible to dispose too much fertilizer in one spot or a relatively insufficient amount of water with the result that the growth may be burned by the fertilizer.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of the fertilizer distributor in use.

Fig. 2 is a longitudinal section of the distributor.

Fig. 3 is a section on the line 3—3 of Fig. 1 showing the course of the flow of the liquid through the device and the pins to puncture the ground.

Fig. 4 is a longitudinal view of a modified puncturing pin.

Referring now more particularly to the characters of reference on the drawing, the apparatus comprises a tubular handle 1 of sufficient length to permit of its use by an operator in a standing position. Slidably disposed over the top of the handle 1 is a cap 2 which is provided with a knurled outer surface to act as a hand grip. A rod 3 is centrally threaded into the cap 2 and depends down through the tubular handle 1. A block 4 mounted in the handle 1 supports a spiral spring 4a on the rod 3 between the cap 2 and the block 4.

An intake fitting 5 is threaded onto the lower end of the handle 1 and an intake hose 6 is connected by means of the coupling 7. A measuring chamber 8 is disposed between the intake fitting 5 and an outlet fitting 9.

The rod 3 extends down through the tubular handle 1 and terminates in the outlet fitting 9.

On the upper end of the measuring chamber 8 is a valve plate 10 formed with a circular opening 11 adapted to be closed by the circular valve gasket 12 which is positioned by the nuts 13 on the rod 3 so that the valve is normally open. On the lower end of the measuring chamber 8 is an inverted valve plate 14 formed with a circular opening 15 adapted to be closed by the circular valve gasket 16 which is positioned by the nut 17 on the lower end of the rod 3 so that the valve is normally closed. By this arrangement of parts the upper valve operates within the fitting 5 and the lower valve operates within the fitting 9. Guides 18 prevent any side motion of the rod 3.

Threaded into the lower opening of the fitting 9 is a short pipe 19 with a flange 20 at right angles to its lower portion. This flange is bolted to the distributor plate 21 which is preferably of a square design and provided with discharge grooves 22. These grooves are cut at intervals and are provided with discharge holes 23 cut through the distributor plate 21.

Puncturing pins 24, pointed at the ground contacting end, are bolted through the distributor plate 21 at regular intervals and secured in position by the nuts 25. These pins are of varied length in order that the fertilizer may reach various depths when the holes are punctured in the ground.

The fertilizer distributor unit is connected to a supply tank 26 as shown in Fig. 1 by the intake hose line 6. This supply tank is mounted upon a cart 27 which can easily be moved from place to place. The supply tank is provided with a plug valve 28 at the lower end of the rod 29 which is supported by the bar 30. In this bar are slots 31 and beneath the bar 30 on the rod 29 is a spring 32 supported on the collar 33. A small pin 33a is mounted in the rod under the spring beneath the bar 30. The valve 28 is normally closed.

A modified form of puncturing apparatus is shown in Fig. 4. This fertilizer distributor consists of a single large pin 34 which is hollow and is provided with outlet holes 35.

In operation the supply tank 26 is filled with a liquid fertilizer and the valve 28 opened by raising the rod 29 until the small pin 33a passes through a slot and then the rod 29 is turned until the pin rests on the bar 30, which results in holding the valve 28 in an open position. The liquid then flows through the hose 6 into the fitting 5 and fills the measuring chamber 8.

As the operator pushes the pins 24 into the ground he grasps the cap 2 and forces it down. This closes the upper valve and opens the lower valve of the measuring chamber. Thus the measured volume of liquid fertilizer passes down through the distributor plate 21 and out through the discharge holes 23 while at the same time the flow of the liquid from the supply tank has been shut off by the closing of the upper valve. The outer discharge holes also discharge through the top of the plate 21 as at 23a, as well as through the under side. This overflow assures an even distribution over the surface while the discharge beneath the plate 21 assures permeation into the holes punched by the pins 24.

If the operator wishes a continual flow it is only necessary to hold the cap 2 in a partially pushed down position and in such position the upper and lower valves of the measuring chamber are open and the liquid fertilizer flows freely into the distributor plate 21 and thence to the ground.

A square distributor plate is preferred because of the ease to block off an area to be fertilized while a circular plate would tend to leave many untouched spaces.

When it is desired to fertilize the ground at a relatively greater depth than that possible with the device as shown in Fig. 2 with the short pins, the modified puncturing apparatus, as shown in Fig. 4, is used. The pin 34 is forced into the ground to the desired depth and the liquid fertilizer flows through the pin and out through the holes 35.

The same measuring chamber 8 is used in connection with this pin and therefore a predetermined amount of liquid fertilizer can be released each time the pin punctures the ground. This form of puncturing device would preferably be used in fertilizing plants, shrubs, trees and the like.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A liquid fertilizer distributor comprising a number of puncturing pins, a discharge plate associated with the pins and provided with bottom outlet holes, a measuring chamber with opposed inlet and outlet openings above the pins, valves to alternately open and close such chamber openings, means to operate the valves, and means connecting the chamber with the grooves.

2. A liquid fertilizer distributor comprising a chamber having opposed inlet and outlet openings, a tubular handle, a rod extending through the handle, a cap on the rod slidable over the handle, a yieldable element normally holding the cap and rod in raised position, the rod projecting through the openings in the chamber, and opposed valves on the rod normally positioned to close the outlet opening and open the inlet opening into the chamber, and a distributing element connected with the chamber.

3. A liquid fertilizer distributor comprising a plate, puncturing pins mounted on and depending from the plate, said plate having top grooves and outlets from said grooves to the bottom of the plate, and means to supply liquid to the grooves.

4. A liquid fertilizer distributor comprising a plate, puncturing pins mounted on and depending from the plate, and means to discharge liquid from underneath the plate and about the sides thereof from above the same.

CHARLES H. GUNN.